United States Patent
Peiffer et al.

(10) Patent No.: US 6,326,431 B1
(45) Date of Patent: Dec. 4, 2001

(54) BIAXIALLY ORIENTED POLYESTER FILM COMPRISING A CYCLOOLEFIN COPOLYMER, ITS USE AND PROCESS FOR ITS PRODUCTION

(75) Inventors: Herbert Peiffer, Mainz; Gottfried Hilkert, Saulheim; Bart Janssens, Wiesbaden, all of (DE)

(73) Assignee: Mitsubishi Polyester Film GmbH (DE)

( * ) Notice: Subject to any disclaimer, the term of this patent is extended or adjusted under 35 U.S.C. 154(b) by 0 days.

(21) Appl. No.: 09/794,507

(22) Filed: Feb. 27, 2001

(30) Foreign Application Priority Data

Mar. 13, 2000 (DE) ................................. 100 12 137

(51) Int. Cl.$^7$ ...................................... C08F 8/00
(52) U.S. Cl. ........................... 525/177; 525/165; 428/212
(58) Field of Search ............................ 428/212; 525/165, 525/177

(56) References Cited

FOREIGN PATENT DOCUMENTS

| | | |
|---|---|---|
| 2 353 347 | 5/1974 | (DE) . |
| 237 070 | 7/1986 | (DE) . |
| 0 156 464 | 10/1985 | (EP) . |
| 0 283 164 | 9/1988 | (EP) . |
| 0 407 870 | 1/1991 | (EP) . |
| 0 485 893 | 5/1992 | (EP) . |
| 0 503 422 | 9/1992 | (EP) . |
| 0 522 758 A1 | 1/1993 | (EP) . |
| 0 812 874 A1 | 12/1997 | (EP) . |
| 1 068 949 A1 | 1/2000 | (EP) . |
| 05 140349 Abstract A | 6/1993 | (JP) . |
| 10 060143 Abstract A | 3/1998 | (JP) . |
| 11 035717 Abstract A | 2/1999 | (JP) . |

OTHER PUBLICATIONS

"Farbmessung", Hans Loos, Verlag Beruf and Schule Itzehoe (1989).

Primary Examiner—Edward J. Cain
(74) Attorney, Agent, or Firm—ProPat, L.L.C.

(57) ABSTRACT

The present invention relates to a milkily translucent, biaxially oriented polyester film with at least a base layer which comprises up to 5% by weight of a cycloolefin copolymer (COC), based on the weight of the base layer, the glass transition temperature of the COC being within the range from 70 to 270° C. The film of the invention is suitable for packing foods or other consumable items which are sensitive to light and/or to air, or for use in industry, e.g. for producing hot-stamping foils or as a label film, or for image-recording papers, printed sheets, or magnetic recording cards, or for metallization.

16 Claims, No Drawings

US 6,326,431 B1

BIAXIALLY ORIENTED POLYESTER FILM COMPRISING A CYCLOOLEFIN COPOLYMER, ITS USE AND PROCESS FOR ITS PRODUCTION

The present invention relates to a milkily translucent, biaxially oriented polyester film which comprises at least one layer which comprises a polyester and a cycloolefin copolymer (COC). The invention further relates to the use of the film and to a process for its production.

BACKGROUND OF THE INVENTION

Milky biaxially oriented polyester films are known from the prior art. These known prior art films have good optical properties, but are difficult to produce.

DE-A 2 353 347 describes a process for producing milky polyester film having one or more layers, which comprises preparing a mixture from particles of a linear polyester with from 3 to 27% by weight of a homopolymer or copolymer of ethylene or propylene, extruding the mixture as a film, quenching the film and biaxially orienting the film by stretching in directions running perpendicular to one another, and heat-setting the film. A disadvantage of this process is that regrind which arises during production of the film (essentially a mixture of polyester raw material and ethylene copolymer or propylene copolymer) cannot be reused without yellowing the film. This makes the process uneconomic, but the film produced with regrind would not gain acceptance in the market. If the amount of copolymer in the polyester is increased, the film loses its milky character and turns white with high opacity.

The object of the present invention was to provide a milkily translucent, biaxially oriented polyester film which has improved ease of production, i.e. low production cost. In particular, it should be possible for the cut material (regrind) directly associated with the production process, in an amount of from 10 to 70% by weight based on the total weight of the film, to be reused for the production process without any significant adverse effect on the physical or optical properties of the film produced using regrind. In particular, the addition of regrind should not cause any significant yellow coloration in the film.

SUMMARY OF THE INVENTION

According to the invention, this object is achieved by means of a milkily translucent, biaxially oriented polyester film with at least a base layer made from polyester, the characterizing features of which are that at least the base layer also comprises an amount of not more than 5% by weight of cycloolefin copolymer (COC), based on the weight of the base layer.

DETAILED DESCRIPTION OF THE INVENTION

The COC incorporated according to the invention into the film is preferably a COC whose glass transition temperature $T_g$ is within the range from 70 to 270° C.

For the purposes of the present invention, a milkily translucent film is a film whose whiteness is within the range from 15 to 110%, preferably from 20 to 100%, particularly preferably from 25 to 90%. The opacity of the milkily translucent film here should be within the range from 5 to 55%, preferably from 10 to 50%, particularly preferably from 15 to 45%. At the same time, the film should have a transparency within the range from 45 to 95%, preferably from 47 to 93%, particularly preferably from 49 to 91%.

Depending on the production conditions, the film of the invention may have a lustrous (metallic-look) surface or a pearlescent (matt- or satin-look) surface. The gloss values for the film of the invention therefore extend over a wide range from 10 to 200, preferably from 12 to 195, particularly preferably from 15 to 190.

To achieve the acquired whiteness, the desired opacity and the desired transparency of the film of the invention, the amount of COC in the base layer should not be above 5% by weight, otherwise the whiteness is above 110%, the opacity is above 55%, and the transparency falls below 45%.

It is also advantageous if the glass transition temperature of the COC used is above 70° C. Otherwise, if the glass transition temperature $T_g$ of the COC used is below 70° C., the polymer mixture is difficult to process, since it becomes difficult to extrude. The desired whiteness is lost and use of regrind gives a film with a tendency toward increased yellowness. On the other hand, if the glass transition temperature $T_g$ of the COC selected is above 270° C. the homogenization of the polymer mixture in the extruder will no longer be sufficient. This then gives a film with undesirably inhomogeneous properties.

In the preferred embodiment of the film of the invention, the glass transition temperature $T_g$ of the COCs used is within the range from 90 to 250° C., and in the particularly preferred embodiment it is within the range from 110 to 220° C.

Surprisingly, it has been found that a milkily translucent film can be produced by adding a COC in the manner described above.

The whiteness, the opacity and the transparency of the film can be adjusted with precision and adapted to particular requirements by varying the amount and nature of the COC added. This means that the use of other milkiness-producing additives can be dispensed with. It was quite sensational to find that the regrind exhibits no tendency toward yellowing, as is observed with the use of conventional polymeric additives as opacifiers in the prior art.

None of the features described was foreseeable. This was particularly the case since COCs are evidently substantially incompatible with polyethylene terephthalate but are known to require stretching ratios and stretching temperatures similar to those for polyethylene terephthalate. Under these circumstances the skilled worker would not have expected that a milkily translucent film could be produced under these production conditions.

In the preferred and particularly preferred embodiments, the film of the invention has high/particularly high metallic or pearlescent luster, while addition of regrind causes extremely little change in the color of the film.

The film of the invention has one or more layers. Single-layer embodiments have the structure identical with that of the COC-containing layer described below. Multilayer embodiments have at least two layers and always comprise the COC-containing layer and at least one other layer, where the COC-containing layer is the base layer but may also form the intermediate layer or the outer layer of a film having more than one layer. In one preferred embodiment, the COC-containing layer forms the base layer of the film with at least one outer layer, preferably with outer layers on both sides, and an intermediate layer or intermediate layers may, if desired, be present on one side or on both sides. In another embodiment, the COC-containing layer also forms an intermediate layer of a multilayer film. Other embodiments with COC-containing intermediate layers have a five-layer structure and, alongside the COC-containing base layer, have COC-containing intermediate layers on both sides. In another embodiment, the COC-containing layer can form, in addition to the base layer, and on one or both sides, an outer layer or outer layers on the base layer or on the intermediate layer. For the purposes of the present invention, the base layer is that layer which makes up 50%–100%, preferably 70–90%, of the total thickness of the film. The outer layers are the layers which form the outermost layers of the film.

Each embodiment of the invention is a milkily translucent film. For the purposes of the present invention, milkily translucent films are films whose light transmittance to ASTM-D 1003-77 is within the range from 45 to 95%, preferably from 47 to 93%, particularly preferably from 49 to 91%.

The COC-containing layer (the base layer) of the film of the invention comprises a polyester, preferably a polyester homopolymer, a COC, and also, if desired, other additives, in each case in effective amounts. This layer generally comprises at least 20% by weight, preferably from 40 to 98% by weight, in particular from 70 to 96% by weight, of polyester, based on the weight of the layer.

The base layer of the film comprises a thermoplastic polyester. Polyesters suitable here are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT) or else from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed of at least 90 mol %, preferably at least 95 mol %, of ethylene glycol units and terephthalic acid units or of ethylene glycol units and naphthalene-2,6-dicarboxylic acid units. The remaining monomer units are derived from other aliphatic, cycloaliphatic or aromatic diols and, respectively, dicarboxylic acids, as may also be present in layer A (A=outer layer 1) or in layer C (C=outer layer 2) of a multilayered ABC (B base layer) film.

Examples of other suitable aliphatic diols are diethylene glycol, triethylene glycol, aliphatic glycols of the general formula HO—$(CH_2)_n$—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclohexanediol). Other suitable aromatic diols are those, for example, of the formula HO—$C_6H_4$—X—$C_6H_4$—OH where X is —$CH_2$—, —$C(CH_3)_2$—, —$C(CF_3)_2$—, —O—, —S— or $SO_2$—. Bisphenols of the formula HO—$C_6H_4$—$C_6H_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the ($C_3$–$C_{19}$)-alkanedioic acids are particularly suitable, where the alkane moiety may be straight-chain or branched.

The polyesters may, for example, be prepared by the transesterification process. The starting materials here are dicarboxylic esters and diols, and these are reacted using the usual transesterification catalysts, such as salts of zinc, of calcium, of lithium, of magnesium or of manganese. The intermediates are then polycondensed in the presence of typical polycondensation catalysts, such as antimony trioxide or titanium salts. They may equally well be prepared by the direct esterification process in the presence of polycondensation catalysts, starting directly from the dicarboxylic acids and the diols.

According to the invention, the COC-containing layer or, in the case of single-layer embodiments, the film, comprises an amount of not more than 5.0% by weight, preferably within the range from 0.1 to 4.5% by weight and particularly preferably from 0.2 to 4.0% by weight, of a cycloolefin copolymer (COC), based on the weight of the base layer or, in the case of single-layer embodiments, based on the weight of the film. It is significant for the present invention that the COC is not compatible with the polyethylene terephthalate and does not form a homogeneous mixture with the same in the melt.

Cycloolefin polymers are homopolymers or copolymers which contain polymerized cycloolefin units and, if desired, acyclic olefins as comonomer. Cycloolefin polymers suitable for the present invention contain from 0.1 to 100% by weight, preferably from 10 to 99% by weight, particularly preferably from 50 to 95% by weight, of polymerized cycloolefin units, in each case based on the total weight of the cycloolefin polymer. Particular preference is given to polymers which have been built up using the monomers comprising the cyclic olefins of the formulae I, II, III, IV, V or VI:

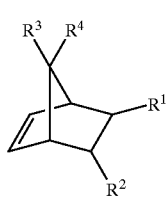
(I)

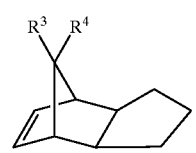
(II)

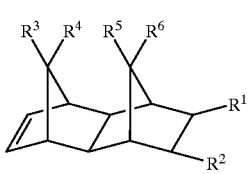
(III)

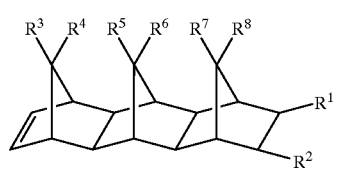
(IV)

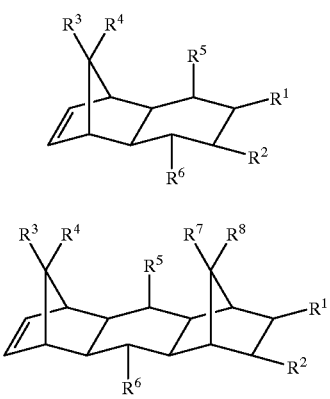

(V)

(VI)

$R^1$, $R^2$, $R^3$, $R^4$, $R^5$, $R^6$, $R^7$ and $R^8$ in these formulae are identical or different and are a hydrogen atom or a $C_1$–$C_{30}$-hydrocarbon radical, or two or more of the radicals $R^1$ to $R^8$ have been bonded cyclically, and the same radicals in the different formulae may have the same or a different meaning. Examples of $C_1$–$C_{30}$-hydrocarbon radicals are linear or branched $C_1$–$C_8$-alkyl radicals, $C_6$–$C_{18}$-aryl radicals, $C_7$–$C_{20}$-alkylenearyl radicals and cyclic $C_3$–$C_{20}$-alkyl radicals and acyclic $C_2$–$C_{20}$-alkenyl radicals.

If desired, the COCs may contain from 0 to 45% by weight, based on the total weight of the cycloolefin polymer, of polymerized units of at least one monocyclic olefin of the formula VII:

(VII)

n here is a number from 2 to 10.

If desired, the COCs may contain from 0 to 99% by weight, based on the total weight of the COC, of polymerized units of an acyclic olefin of the formula VIII:

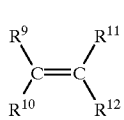

(VIII)

$R^9$, $R^{10}$, $R^{11}$ and $R^{12}$ here are identical or different and are a hydrogen atom or a $C_1$–$C_{10}$-hydrocarbon radical, e.g. a $C_1$–$C_8$-alkyl radical or a $C_6$–$C_{14}$-aryl radical.

Other polymers suitable in principle are cycloolefin polymers which are obtained by ring-opening polymerization of at least one of the monomers of the formulae I to VI, followed by hydrogenation.

Cycloolefin homopolymers have a structure composed of one monomer of the formulae I to VI. These cycloolefin polymers are less suitable for the purposes of the present invention. Polymers suitable for the purposes of the present invention are cycloolefin copolymers (COC) which comprise at least one cycloolefin of the formulae I to VI and acyclic olefins of the formula VIII as comonomer. Acyclic olefins preferred here are those which have from 2 to 20 carbon atoms, in particular unbranched acyclic olefins having from 2 to 10 carbon atoms, for example ethylene, propylene and/or butylene. The proportion of polymerized units of acyclic olefins of the formula VIII is up to 99% by weight, preferably from 5 to 80% by weight, particularly preferably from 10 to 60% by weight, based on the total weight of the respective COC.

Among the COCs described above, those which are particularly preferred contain polymerized units of polycyclic olefins having a fundamental norbornene structure, particularly preferably norbornene or tetracyclododecene. Particular preference is also given to COCs which contain polymerized units of acyclic olefins, in particular ethylene. Particular preference is in turn given to norbornene-ethylene copolymers and tetracyclododecene-ethylene copolymers which in each case contain from 5 to 80% by weight, preferably from 10 to 60% by weight, of ethylene (based on the weight of the copolymer).

The cycloolefin polymers generically described above generally have glass transition temperatures $T_g$ in the range from –20 to 400° C. However, COCs which can be used for the invention have a glass transition temperature $T_g$ above 70° C., preferably above 90° C. and in particular above 110° C. The viscosity number (decalin, 135° C., DIN 53 728) is advantageously from 0.1 to 200 ml/g, preferably from 50 to 150 ml/g.

The COCs are prepared by heterogeneous or homogeneous catalysis with organometallic compounds, as described in a wide variety of documents. Suitable catalyst systems based on mixed catalysts made from titanium compounds and, respectively, vanadium compounds in conjunction with aluminum organyl compounds are described in DD 109 224, DD 237 070 and EP-A-0 156 464. EP-A-0 283 164, EP-A-0 407 870, EP-A-0 485 893 and EP-A-0 503 422 describe the preparation of COCs with catalysts based on soluble metallocene complexes. The preparation processes for COCs described in the abovementioned specifications are expressly incorporated herein by way of reference.

The COCs are incorporated into the film either in the form of pure granules or in the form of granulated concentrate (masterbatch), by premixing the polyester granules or polyester powder with the COC or, respectively, with the COC masterbatch, followed by feeding to an extruder. In the extruder, the mixing of the components continues and they are heated to the processing temperature. It is advantageous here for the novel process if the extrusion temperature is above the glass transition temperature $T_g$ of the COC, generally above the glass transition temperature of the COC by at least 5 K, preferably by from 10 to 180 K, in particular by from 15 to 150 K.

For the intermediate layers and for the outer layers, it is possible in principle to use the polymers used for the base layer. Besides these, other materials may also be present in the outer layers, and the outer layers are then preferably composed of a mixture of polymers or of a copolymer or of a homopolymer which comprises ethylene 2,6-naphthalate units and ethylene terephthalate units. Up to 30 mol % of the polymers may be composed of other comonomers (e.g. ethylene isophthalate units).

The base layer and the other layers may additionally comprise conventional additives, such as stabilizers, antiblocking agents and other fillers. They are advantageously added to the polymer or, respectively, to the polymer mixture prior to melting. Examples of stabilizers used are phosphorus compounds, such as phosphoric acid or phosphoric esters. Depending on the application sector, the milkily translucent film of the invention may moreover be UV-resistant (see in this connection WO 98/06575) or flame-retardant, or UV-resistant and flame-retardant in combination.

Typical flame retardants include bromine compounds, chloroparaffins and other chlorine compounds, antimony trioxide, alumina trihydrates, but the halogen compounds are disadvantageous because they produce halogen-containing by-products. Further extreme disadvantages are the low lightfastness of films equipped with these materials and the development of hydrogen halides in the event of a fire.

Examples of suitable flame retardants used according to the invention are organic phosphorus compounds, such as carboxyphosphinic acids, anhydrides of these and dimethyl methylphosphonate.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

The additives selected may also comprise mixtures of two or more different antiblocking agents or mixtures of antiblocking agents of the same composition but different particle sizes. The particles may be added to the polymers of the individual layers of the film in the respective advantageous amounts, e.g. as a glycolic dispersion during the polycondensation or via masterbatches during extrusion. Pigment concentrations which have proven particularly suitable are from 0 to 25% by weight (based on the weight of the respective layer). EP-A-0 602 964, for example, describes the antiblocking agents in detail.

To improve the milkily translucent character of the film of the invention, the base layer or the other additional layers may comprise further pigmentation. It has proven particularly useful here for the additional additives selected to be barium sulfate with a particle size of 0.3 to 0.8 $\mu$m, preferably from 0.4 to 0.7 $\mu$m, measured by the sedigraph method, or titanium dioxide with a particle size of from 0.05 to 0.3 $\mu$m. This gives the film a brilliant appearance. The amount of barium sulfate or titanium dioxide is within the range from 0.1 to 25% by weight, preferably from 0.2 to 20% by weight, and very particularly preferably from 0.3 to 15% by weight.

The total thickness of the film may vary within wide limits and depends on the application envisaged. The preferred embodiments of the novel film have total thicknesses of from 4 to 400 $\mu$m, preferably from 8 to 300 $\mu$m, particularly preferably from 10 to 300 $\mu$m. The thickness of any intermediate layer(s) present is/are, in each case independently of one another, from 0.5 to 15 $\mu$m, preferably from 1 to 10 $\mu$m, in particular from 1 to 8 $\mu$m. All the values given are based on one intermediate layer. The thickness of the outer layer(s) is selected independently of the other layers and is preferably within the range from 0.1 to 10 $\mu$m, in particular from 0.2 to 5 $\mu$m, preferably from 0.3 to 2 $\mu$m, and outer layers applied on both sides may be identical or different in terms of their thickness and composition. The thickness of the base layer is therefore given by the difference between the total thickness of the film and the thickness of the outer and intermediate layer(s) applied, and, similarly to the total thickness, may therefore vary within wide limits.

The invention further provides a process for producing the polyester film of the invention by the extrusion or coextrusion process known per se.

For the coextrusion process, the procedure is that the melt(s) corresponding to the single-layer film or to the individual layers of the film is/are extruded/coextruded through a flat-film die, the resultant film is drawn off for solidification on one or more rolls, the film is then biaxially stretched (oriented), and the biaxially stretched film is then heat-set and, if desired, corona- or flame-treated on the surface layer intended for further treatment.

The biaxial orientation is generally carried out in succession. For this, it is preferable to orient first longitudinally (i.e. in MD, the machine direction) and then transversely (i.e. in TD, perpendicularly to the machine direction). This orientates the molecular chains. The longitudinal orientation preferably takes place with the aid of two rolls rotating at different rates corresponding to the desired stretching ratio. For the transverse stretching, an appropriate tenter frame is generally used.

In an advantageous embodiment, the orientation may also take place in a simultaneous stretching frame (simultaneous stretching). The number of stretching steps here in both directions (MD and TD), and the sequence thereof are not of decisive importance for the properties of the film. Useful stretching temperatures here are <135° C., particularly <130° C. The stretching ratios correspond to those for the conventional sequential process.

The temperature at which the orientation is carried out may be varied over a relatively wide range and depends on the properties desired in the film. In general, the longitudinal stretching is carried out at from 80 to 130° C. and the transverse stretching at from 90 to 150° C. The longitudinal stretching ratio is generally within the range from 2.5:1 to 6:1, preferably from 3:1 to 5.5:1. The transverse stretching ratio is generally within the range from 3.0:1 to 5.0:1, preferably from 3.5:1 to 4.5:1.

In the heat-setting which follows, the film is held at a temperature of from 150 to 250° C. for from about 0.1 to 10 s. The film is then cooled and then wound up in the usual manner.

To establish other desired properties, the film may be chemically treated or else corona- or, respectively, flame-treated. The intensity of treatment is selected such that the surface tension of the film is generally above 45 mN/m.

To establish other properties, the film may also be coated. Typical coatings have adhesion-promoting, anti-static, slip-improving or release action. It is clear that these additional coatings may be applied to the film by in-line coating using aqueous dispersions, prior to the transverse stretching procedure.

The particular advantage of the novel film is its specific whiteness in combination with its specific opacity and at the same time specific transparency.

Another particular advantage of the invention is that regrind produced directly during the production process can be reused for the film production at a concentration of from 10 to 70% by weight, based on the total weight of the film, without any significant negative effect on the physical properties of the film. In particular, the regrind (composed essentially of polyester and COC) does not give undefined changes in the color of the film, as is the case in the films of the prior art.

A further advantage of the invention is that the production costs of the novel film are comparable with those of conventional opaque films of the prior art. The other properties of the novel film relevant to its processing and use remain essentially unchanged or are even improved.

The film has excellent suitability for packing foods or other consumable items which are sensitive to light and/or to air. It is also highly suitable for use in the industrial sector, e.g. for producing hot-stamping foils or as a label film.

Besides this, the film is, of course, particularly suitable for image-recording papers, printed sheets, and magnetic recording cards, to name just a few possible applications. The special metallic character of the film becomes particularly conspicuous and can thus also be used for advertising purposes for example.

The most important film properties according to the invention are again summarized in the table below (Table 1), thus providing a particularly clear picture.

TABLE 1

| | Range according to the invention | Preferred | Particularly preferred | Unit | Test method |
|---|---|---|---|---|---|
| Composition | | | | | |
| Concentration of cycloolefin copolymer (COC) in base layer | ≦5 | 0.1–4.5 | 0.2–4.0 | % | |
| Glass transition temperature of cycloolefin copolymer (COC) | 70–270 | 90–250 | 110–220 | °C. | DIN 73 765 |
| Film properties | | | | | |
| Whiteness | 15–110 | 20–100 | 25–90 | % | Berger |
| Opacity | 5–55 | 10–50 | 15–45 | % | DIN 53 146 |
| Transparency | 45–95 | 47–93 | 49–91 | | ASTM-D 1033-77 |
| Gloss | 10–200 | 12–195 | 15–190 | | DIN 67 530 |
| Average roughness $R_a$ | 20–300 | 25–250 | 30–200 | nm | DIN 4768, cutoff of 0.25 mm |

The following parameters were used to describe the polymers and the films:

SV (DCA), IV (DCZ)

The standard viscosity SV (DCA) is determined in dichloroacetic acid by analogy with DIN 53726. The intrinsic viscosity (IV) is calculated as follows from the standard viscosity (SV)

$$IV(DCA) = 6.67 \cdot 10^{-4} \, SV(DCA) + 0.118$$

Surface Defects, Homogeneous Coloring

The surface defects and homogeneous coloring are determined visually.

Coefficient of Friction

The coefficient of friction is determined to DIN 53 375. The coefficient of sliding friction was measured 14 days after production.

Surface Tension

The surface tension was determined by a method known as the ink method (DIN 53 364).

Roughness

The roughness $R_a$ of the film was determined to DIN 4768 with a cut-off of 0.25 mm.

Whiteness and Opacity

The whiteness and opacity were determined with the aid of a Zeiss, Oberkochem (DE) "ELREPHO" reflectance photometer, standard illuminant C, 2° normal observer. Opacity is determined to DIN 53 146. Whiteness is defined as W=RY+3RZ–3RX. W=whiteness, RY, RZ or RX=relevant reflection factors when the Y, Z or X measurement filter is used. The white standard used was a barium sulfate pressing (DIN 5033, Part 9). A detailed description is given in Hansl Loos, "Farbmessung" [color measurement], Verlag Beruf und Schule, Itzehoe (1989).

Light Transmittance (Transparency)

Light transmittance is measured using a method based on ASTM D1033-77.

Gloss

Gloss was determined to DIN 67 530. The reflectance was measured as an optical value characteristic of a film surface. Based on the standards ASTM D523-78 and ISO 2813, the angle of incidence was set at 60°. A beam of light hits the flat test surface at the set angle of incidence and is reflected and/or scattered by this surface. A proportion of electrical variable is displayed representing light rays hitting the photoelectronic detector. The value measured is dimensionless and must be stated together with the angle of incidence.

Glass Transition Temperature

The glass transition temperature $T_g$ was determined on film specimens with the aid of DSC (differential scanning calorimetry) (DIN 73 765). A DuPont DSC 1090 was used. The heating rate was 20 K/min and the specimen weight was about 12 mg. The glass transition $T_g$ was determined in the first heating procedure. Many of the specimens showed an enthalpy relaxation (a peak) at the beginning of the step-like glass transition. The temperature taken as $T_g$ was that at which the step-like change in heat capacity—without reference to the peak-shaped enthalpy relaxation—achieved half of its height in the first heating procedure. In all cases, there was only a single glass transition observed in the thermogram in the first heating procedure.

EXAMPLE 1

Inventive

Chips of polyethylene terephthalate (prepared by the transesterification process using Mn as trans-esterification catalyst, Mn concentration: 100 ppm) were dried at 150° C. to a residual moisture below 100 ppm and fed to the extruder for the base layer B. Alongside this, chips of ®Topas 6015 cycloolefin copolymer (COC) from Ticona (COC composed of 2-norbornene and ethylene, see also W. Hatke: Folien aus COC [COC Films], Kunststoffe 87 (1997) 1, pp. 58–62) with a glass transition temperature $T_g$ of about 160° C. were also fed to the extruder for the base layer B. The proportional amount of the cycloolefin copolymer (COC) in the entire film was 2% by weight.

Extrusion followed by a stepwise longitudinal and transverse orientation is used to produce a white, opaque, single-layer film with a total thickness of 23 μm.

Base layer B was a mixture of:

| 98.0% by weight | of polyethylene terephthalate homopolymer with an SV of 800 |
|---|---|
| 2.0% by weight | of cycloolefin copolymer (COC) from Ticona, Topas 6015 |

The production conditions in the individual steps of the process were:

| Extrusion: | Temperatures Base layer: | 280° C. |
|---|---|---|
| | Take-off roll temperature: | 30° C. |
| Longitudinal stretching: | Temperature: | 80–125° C. |
| | Longitudinal stretching ratio: | 4.2 |
| Transverse | Temperature: | 80–135° C. |

-continued

| stretching: | Transverse stretching ratio: | 4 |
| Setting: | Temperature: | 230° C. |
| | Duration: | 3 s |

The film had the required good properties and the desired handling properties, and the desired processing performance. The properties achieved in films produced in this way are shown in Table 2.

EXAMPLE 2

Inventive

Example 1 was now modified by adding 50% of regrind into the base layer. The amount of COC within the film produced in this way was again 2% by weight. The process parameters were unchanged from Example 1. Visual observation was made of any yellow coloration in the film. Table 2 shows that hardly any yellow coloration was observed in the film.

Base layer B was a mixture of:

| 49.0% by weight | of polyethylene terephthalate homopolymer with an SV of 800 |
| 50.0% by weight | of regrind (98% by weight of polyester + 2% by weight of Topas 6015) |
| 1.0% by weight | of cycloolefin copolymer (COC) from Ticona, Topas 6015 |

EXAMPLE 3

Inventive

Example 1 was now modified by producing a film of 96 μm thickness. The amount of COC in the film was 1% by weight. The process parameters were unchanged from Example 1. Any yellow coloration in the film was observed visually. Table 2 shows that hardly any yellow coloration was observed in the film.

Base layer B was a mixture of:

| 99.0% by weight | of polyethylene terephthalate homopolymer with an SV of 800 |
| 1.0% by weight | of cycloolefin copolymer (COC) from Ticona, Topas 6015 |

EXAMPLE 4

Inventive

Example 3 was now modified by adding 50% by weight of regrind into the base B. The amount of COC in the film was again 1% by weight. The process parameters were unchanged from Example 1. Any yellow coloration in the film was observed visually. Table 2 shows that hardly any yellow coloration was observed in the film.

Base layer B was a mixture of:

| 49.5% by weight | of polyethylene terephthalate homopolymer with an SV of 800 |
| 50.0% by weight | of self-generated regrind (99% by weight of polyester + 1% by weight of Topas 6015) |
| 0.5% by weight | of cycloolefin copolymer (COC) from Ticona, ,Topas 6015 |

COMPARATIVE EXAMPLE 1

Example 1 from DE-A 2 353 347 was repeated. The example was modified with concomitant use of 50% by weight of regrind. It can be seen from Table 2 that marked yellow coloration of the film was observed. In addition, the transparency of the film is much too low.

Base layer B was a mixture of:

| 47.5% by weight of | polyethylene terephthalate homopolymer with an SV of 800 |
| 50.0% by weight of | self-generated regrind (95% by weight of polyester + 5% by weight of polypropylene) |
| 2.5% by weight of | polypropylene |

TABLE 2

| Example | Film thickness μm | Layer structure | Added to polyester | Additive concentration in base layer % | Glass transition temperature of additive ° C. | Whiteness % | Opacity % | Evaluation of film yellowness | Gloss | Coefficient of friction COF Side A against Side C | Average roughness R, nm Side A | Side C |
|---|---|---|---|---|---|---|---|---|---|---|---|---|
| E 1 | 23 | B | COC | 2 | 170 | 70 | 40 | ++ | 130 | 0.52 | 120 | |
| E 2 | 23 | B | COC | 2 | 170 | 74 | 40 | + | 128 | 0.50 | 110 | |
| E 3 | 96 | B | COC | 1 | 170 | 72 | 38 | ++ | 140 | 0.42 | 100 | |
| E 4 | 96 | B | COC | 1 | 170 | 70 | 38 | + | 145 | 0 35 | 98 | |
| CE 1 | 155 | B | Polypropylene | 5 | −10 | 80 | 70 | − | 46 | 0.45 | 410 | |

Key to yellowness in films produced:
++: no yellowing detectable
+: slight yellow coloration detectable
−: marked yellow coloration detectable

What is claimed is:

1. A milkily translucent, biaxially oriented polyester film comprising at least one layer, wherein said layer includes a cycloolefin copolymer (COC) in an amount of not more than about 5% by weight, based on the weight of said layer.

2. The milkily translucent polyester film as claimed in claim 1, wherein the COC includes polynorbornene, polydimethyloctahydronaphthalene, polycyclopentene or poly(5-methyl)norbornene and the glass transition temperature of the COC is within the range from about 70 to about 270° C.

3. The milkily translucent polyester film as claimed in claim 1, wherein the layer includes the COC in an amount within the range from about 0.1 to about 4.5% by weight based on the weight of the layer, and the COC has a glass transition temperature within the range from about 90 to about 250° C.

4. The milkily translucent polyester film as claimed in claim 1, wherein the layer includes the COC in an amount within the range from about 0.2 to about 4.0% by weight based on the weight of the layer, and the COC has a glass transition temperature within the range from about 110 to about 220° C.

5. The milkily translucent polyester film as claimed in claim 1, wherein the film exhibits a whiteness within the range from about 15 to about 110%.

6. The milkily translucent polyester film as claimed in claim 1, wherein the film exhibits an opacity within the range from about 5 to about 55%.

7. The milkily translucent polyester film as claimed in claim 1, wherein the film exhibits a transparency within the range from about 45 to about 95%.

8. The milkily translucent polyester film as claimed in claim 1, wherein the layer includes about 0.5 to about 25% by weight of one or more of vacuole-initiating particles, white fillers and pigments, in each case based on the weight of the layer.

9. The milkily translucent polyester film as claimed in claim 1, wherein at least one outer layer has been arranged on the COC-containing layer.

10. The milkily translucent polyester film as claimed in claim 9, wherein an intermediate layer has been arranged between the COC-containing layer and the outer layer.

11. The milkily translucent polyester film as claimed in claim 1, said film being single-layered and consisting of the COC-containing layer.

12. A process for producing a milkily translucent polyester film as claimed in claim 1, in which the melt corresponding to a single-layer film or the melts corresponding to the individual layers of the film are extruded or coextruded through a flat-film die, the resultant film is drawn off on one or more rolls for solidification, the film is then biaxially stretched, and the biaxially stretched film is heat-set and, if desired, corona- or flame-treated on at least one surface, which comprises carrying out the biaxial orientation in succession, first orienting longitudinally and then transversely, the temperature during the longitudinal stretching being within the range from about 80 to about 130° C. and the temperature during the transverse stretching being within the range from about 90 to about 150° C., and the longitudinal stretching ratio being within the range from about 2.5:1 to about 6:1, and the transverse stretching ratio being within the range from about 3.0:1 to about 5.0:1.

13. A process for producing the milkily translucent polyester film as claimed in claim 1, in which the melt corresponding to a single-layer film or the melts corresponding to the individual layers of the film are extruded or coextruded through a flat-film die, the resultant film is drawn off on one or more rolls for solidification, the film is then biaxially stretched, and the biaxially stretched film is heat-set and, if desired, corona- or flame-treated on at least one surface, which comprises carrying out the biaxial orientation simultaneously and in a simultaneous stretching frame, the stretching temperatures being $\leq 135°$ C.

14. The process as claimed in claim 12 or 13, wherein, for heat-setting, the oriented film is held for from about 0.1 to about 10 s at a temperature within the range from about 150 to about 250° C., then cooled and then wound up.

15. The process as claimed in claims 12 or 13, wherein, to establish other desired properties, at least one surface of the film is chemically treated or corona- or flame-treated, the intensity of the treatment being set so that the surface tension of the film is above about 45 mN/m.

16. The process as claimed in claim 12, wherein, to establish other properties, the film is coated with a coating which has adhesion-promoting, antistatic, slip-improving or release action, this additional coating being applied to the film by in-line coating using aqueous dispersions after the longitudinal stretching and before the transverse stretching.

* * * * *